(12) United States Patent
Rui et al.

(10) Patent No.: US 8,438,290 B2
(45) Date of Patent: *May 7, 2013

(54) METHOD FOR SELECTING A POLICY AND CHARGING RULES FUNCTION ENTITY IN THE NON-ROAMING SCENARIO

(75) Inventors: Tong Rui, Shenzhen (CN); Zaifeng Zong, Shenzhen (CN); Xiaoyun Zhou, Shenzhen (CN); Jinguo Zhu, Shenzhen (CN); Jun Song, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 346 days.

This patent is subject to a terminal disclaimer.

(21) Appl. No.: 12/812,044

(22) PCT Filed: Dec. 24, 2008

(86) PCT No.: PCT/CN2008/002064
§ 371 (c)(1),
(2), (4) Date: Jul. 8, 2010

(87) PCT Pub. No.: WO2009/086734
PCT Pub. Date: Jul. 16, 2009

(65) Prior Publication Data
US 2010/0281170 A1    Nov. 4, 2010

(30) Foreign Application Priority Data
Jan. 9, 2008  (CN) .......................... 2008 1 0001559

(51) Int. Cl.
G06F 15/16   (2006.01)
(52) U.S. Cl.
USPC .................... 709/227; 709/228; 726/1; 726/2

(58) Field of Classification Search .......... 709/227–228; 370/328; 726/1; 455/432.1
See application file for complete search history.

(56) References Cited

U.S. PATENT DOCUMENTS 7,773,571 B1 *  8/2010  Maxwell et al. .............. 370/338
7,895,145 B2 *  2/2011  Wang et al. .................... 706/46

(Continued)

FOREIGN PATENT DOCUMENTS

| CN | 1988722 A | 6/2007 |
| CN | 101035001 A | 9/2007 |

(Continued)

OTHER PUBLICATIONS

International Search Report for PCT/CN2008/002064, Prepared by the Chinese Patent Office, Dated Feb. 18, 2009, 6 Pages.

(Continued)

*Primary Examiner* — Abdullahi Salad
(74) *Attorney, Agent, or Firm* — Brooks Kushman P.C.

(57) ABSTRACT

A method for selecting a policy and charging rules function entity in the non-roaming scenario includes the following steps: when a diameter routing agent DRA receives an indication message of the IP connectivity access network IP-CAN session establishment, the indication message is forwarded to a PCRF according to the related relationship which is set up and saved for allocating the policy and charging rules function PCRF entity to the IP-CAN session; and the corresponding policy and charging control PCC policy, which is made for the IP-CAN session by the PCRF, is forwarded to the provider's IP application function AF and the network element, which has policy and charging enforcement function, corresponding to the IP-CAN session.

8 Claims, 3 Drawing Sheets

U.S. PATENT DOCUMENTS

| | | | | |
|---|---|---|---|---|
| 8,042,148 | B2* | 10/2011 | Andreasen et al. | 726/1 |
| 2007/0066286 | A1* | 3/2007 | Hurtta | 455/414.1 |
| 2007/0226775 | A1* | 9/2007 | Andreasen et al. | 726/1 |
| 2008/0052258 | A1* | 2/2008 | Wang et al. | 706/46 |
| 2008/0137592 | A1* | 6/2008 | Ahmavaara et al. | 370/328 |
| 2009/0043902 | A1* | 2/2009 | Faccin | 709/229 |
| 2010/0235620 | A1* | 9/2010 | Nylander et al. | 713/151 |
| 2010/0281170 | A1 | 11/2010 | Rui et al. | |
| 2010/0284336 | A1 | 11/2010 | Rui et al. | |

FOREIGN PATENT DOCUMENTS

| | | |
|---|---|---|
| CN | 101047988 | 10/2007 |
| CN | 101047989 | 10/2007 |
| CN | 101060413 | 10/2007 |
| CN | 101072170 | 11/2007 |
| CN | 101198171 | 6/2008 |
| CN | 101217789 A | 7/2008 |
| CN | 101217810 | 7/2008 |
| CN | 101227391 A | 7/2008 |
| WO | 2004004301 | 1/2004 |
| WO | 2007071651 | 6/2007 |
| WO | 2007113636 A2 | 10/2007 |
| WO | 2007143940 | 12/2007 |

OTHER PUBLICATIONS

3GPP Organizational Partners, 3GPP TS 23.203 v8.0.0: "Policy and charging control architecture (Release 8)", http://www.3gpp.org. 74 Pages.

International Search Report for PCT/CN2008/002064 dated Mar. 5, 2009.

Ericsson, Proposal for how to progress work on PCRF discovery in cooperation with CT groups, 3GPP TSG SA WG2 Meeting #62, (TD S2-080114) Marina Del Rey, California, Jan. 14-18, 2008, pp. 1-2.

Zte, Issues related to the PCRF, 3GPP TSG SA WG2 Meeting #61, (TD 52-075066) Ljubljana, Slovenia, Nov. 12-16, 2007, pp. 1-4.

Huawei, Clarifications for PCRF Selection, 3GPP TSG SA WG2 Meeting #62, (TD S2-080134) Marina Del Ray, California, Jan. 14-18, 2008, pp. 1-3.

Zte, PCRF selection 3GPP TSG SA WG2 Meeting #61, (TD S2-075065) Ljubljana, Slovenia, Nov. 12-16, 2007, pp. 1-8.

Supplementary European Search Report for European Application No. 08871785, Feb. 23, 2011, pp. 1-8.

International Search Report for PCT/CN2008/073276, Mar. 5, 2009, pp. 1-8.

* cited by examiner

METHOD FOR SELECTING A POLICY AND CHARGING RULES FUNCTION ENTITY IN THE NON-ROAMING SCENARIO

CROSS-REFERENCE TO RELATED APPLICATION

This application is the U.S. national phase of PCT Appln. No. PCT/CN08/02064 filed Dec. 24, 2008 which claims priority to Chinese Application No. 200810001559.0 filed Jan. 9, 2008, the disclosures of which are incorporated in their entirety by reference herein.

TECHNICAL FIELD

The present invention relates to a method for selecting a policy and charging rules function entity in the $3^{rd}$ Generation Partnership Project (3GPP) Evolved Packet Core (EPC) network architecture.

TECHNICAL BACKGROUND

A 3GPP Evolved Packet System (EPS) is composed of an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication Authorization Accounting (AAA) server, a Policy and Charging Rules Function (PCRF) entity and other supporting nodes. Wherein, the MME is responsible for control plane related works, such as mobility management, processing of signaling on non-access layers and management of the context of the mobility management of subscribers; the S-GW, which is an access gateway device connected to the E-UTRAN, forwards data between the E-UTRAN and the P-GW and is responsible for buffering paging waiting data; the P-GW, which is a border gateway between the 3GPP EPS and a Packet Data Network (PDN), is responsible for the access of the PDN and forwards data between the EPS and the PDN; the PCRF, which is a policy and charging rules function entity, interacts with an IP Application Function (AF) of an operator via an Rx interface to obtain service information, the PCRF is connected to gateway devices (S-GW and P-GW) in the network through S7/S7a/S7c interfaces and is responsible for initiating setup of an IP carrier, ensuring Quality of Service (QoS) of service data and controlling the charging.

FIG. 1 is a block diagram of the architecture of the EPS. The EPS supports and implements interworking with a non-3GPP network via S2a/S2b/S2c interfaces. The P-GW acts as an anchor point between the 3GPP and non-3GPP networks. A non-3GPP system is divided into a trusted non-3GPP IP access and an untrusted non-3GPP IP access. The trusted non-3GPP IP access may directly interface with the P-GW via the S2a interface; while the untrusted non-3GPP IP access has to connect with the P-GW via an evolved Packet Data Gateway (ePDG). The interface between the ePDG and the P-GW is S2b.

In the traditional 3GPP network, the Policy and Charging Enforcement Function (PCEF) exists only in the P-GW, the PCRF can control all the functions as long as it interfaces with the P-GW, and the PCRF exchanges information with the P-GW via the S7 interface, as shown in FIG. 1.

However, after the 3GPP network provides the function of interworking with the non-3GPP network, when the interface between the P-GW and the S-GW is based on the Packet Mobile Internet Protocol (PMIP), the policy enforcement function part in the PCEF, which is called Gateway Control Function (GWCF), such as the binding function of a carrier, also exists in the S-GW. The S-GW exchanges information with the PCRF via the S7c interface (see FIG. 1). When the trusted non-3GPP access system accesses and interworks with the 3GPP system via the S2a interface, the GWCF also resides in the trusted non-3GPP access gateway, as shown in FIG. 1.

There is a plurality of PCRF nodes in a Public Land Mobile Network (PLMN) of the EPS, and all of the PCRF nodes belong to one or more Diameter (PCRF) domains, with all the PCRFs in a Diameter (PCRF) domain being equal. A connection from a UE to a PDN is referred to as an IP Connectivity Access Network (IP-CAN) session. In order to ensure that the Policy and Charging Control (PCC) of one IP-CAN session is determined by only one PCRF, the EPS introduces a logical function entity, namely a Diameter Routing Agent (DRA) network element, into each Diameter (PCRF) domain. When the UE initiates setup of an IP-CAN session, the DRA selects a PCRF for this IP-CAN session.

When a UE is in a non-roaming scenario and the 3GPP core network applies the EPC architecture, typically, three cases exist: the first is that the UE is within the coverage of the 3GPP; the second is that the UE is within the coverage of the trusted non-3GPP, and the third is that the UE is within the coverage of the untrusted non-3GPP.

However, for the three cases in which the UE is in a non-roaming scenario, there is no specific planning in the current EPS for the DRA to select a PCRF. Besides, since the policy enforcement function part exists in many network elements, such as the S-GW and P-GW (GWCF and PCEF), when the S-GW and P-GW both require the DRA to select a PCRF, the PCRFs selected by the DRA for the same IP-CAN session might be inconsistent. Therefore, a problem in the prior art need to be solved urgently: how to associate, through the DRA, all of the PCEF, GWCF and AF related to one IP-CAN session of a UE with the same PCRF, when the UE is in the non-roaming scenario.

SUMMARY OF THE INVENTION

A technical problem to be solved by the present invention is to provide a method for selecting a policy and charging rules function entity in a non-roaming scenario, such that a DRA can associate all of the PCEF, GWCF and AF related to an IP-CAN session of a UE in the non-roaming scenario with the same PCRF.

In order to solve the above technical problem, the present invention provides a method for selecting a Policy and Charging Rules Function (PCRF) entity in a non-roaming scenario, comprising:

when a Diameter Routing Agent (DRA) receives an IP Connectivity Access Network (IP-CAN) session setup indication message, the DRA forwarding the session setup indication message to a PCRF according to an association relation established and stored for allocating the PCRF entity to the IP-CAN session; and forwarding a corresponding Policy and Charging Control (PCC) policy, which is made by the PCRF for the IP-CAN session, to a network element having a policy and charging enforcement function and an IP Application Function (AF) of an operator corresponding to the IP-CAN session.

Furthermore, the DRA allocates the PCRF entity according to a Packet Data Network Identification (PDN ID) carried in the indication message or according to local configuration condition.

Furthermore, the method further comprises steps of:

(a) when a user equipment (UE) initiates an IP-CAN session setup request, the network element having the policy and charging enforcement function sending the indication message to the DRA;

(b) after the DRA receives the indication message, the DRA searching the association relation stored locally, and if the IP-CAN session does not exist in the association relation, binding and storing an address of the PCRF allocated to the IP-CAN session, an identification of the IP-CAN session (IP-CAN ID) and the PDN ID in the local association relation; if the IP-CAN session exists in the association relation, acquiring a stored address of the PCRF associated with the IP-CAN session; and the DRA forwarding the indication message according to the address of the PCRF associated with the IP-CAN session;

(c) after the PCRF receives the indication message, the PCRF making the PCC policy for the IP-CAN session, and forwarding, through the DRA, a response message containing the PCC policy to the entity network element having the policy and charging enforcement function;

(d) the AF sending a message of the IP-CAN session service to the PCRF through the DRA; the DRA searching the association relation stored locally, and forwarding the message of the session service to the PCRF according to the address of the PCRF associated with the IP-CAN session; and (e) after the PCRF receives the message of the session service, the PCRF making a corresponding PCC policy for the session service, and forwarding a response message containing the PCC policy to the AF through the DRA.

Furthermore, the entity having the policy and charging enforcement function is a Policy and Charging Enforcement Function (PCEF) entity or a Gateway Control Function (GWCF) entity.

Furthermore, the IP-CAN session setup indication message is sent by the PCEF entity or the GWCF entity, and afterwards, when the DRA further receives a different session setup indication message related to the IP-CAN session, the method further comprises steps of:

the DRA forwarding the session setup indication message to the PCRF according to an address of the PCRF acquired by searching; and after the PCRF receives the session setup indication message, the PCRF making a corresponding PCC policy for the session, and forwarding, through the DRA, a response message containing the PCC policy to an entity which sent the different session setup indication message.

Furthermore, information carried in the indication message further includes the IP-CAN ID, an identification of the UE (UE ID), and an IP address of the UE (UE IP address); and the association relation of the IP-CAN session stored in the DRA further includes an address of the PCEF entity or an address of the GWCF entity, an address of the AF, the UE ID, the UE IP address and an address of the PCRF.

Furthermore, the PCEF entity resides in a packet data network gateway or a trusted non-3GPP access gateway; the GWCF entity resides in a service gateway.

With the method of the present invention, the EPS of the 3GPP is able to associate all of the PCEF, GWCF and AF related to an IP-CAN session of a UE in a non-roaming scenario with the same PCRF, so as to ensure that the PCC policy of one IP-CAN session is determined by only one PCRF.

PREFERRED EMBODIMENTS OF THE INVENTION

The present invention provides a method for selecting a policy and charging rules function entity in a non-roaming scenario, which comprises the following steps:

(a) When a UE initiates setup of an IP-CAN session, a PCEF entity or a GWCF entity sends a request message indicating the IP-CAN session is set up to a DRA, to request, though the DRA, a PCRF to transmit a PCC policy associated with the IP-CAN session.

Herein, the PCEF entity or the GWCF entity includes any one or more of a P-GW, an S-GW and a trusted non-3GPP access gateway.

(b) After the DRA receives the request message from the PCEF entity or the GWCF entity, it searches a locally stored association relation table; takes a PCRF address associated with the IP-CAN session as a destination address if the IP-CAN session exists in the association relation table; or else allocates a PCRF to the IP-CAN session, stores the allocation result in the local association relation table, and binds the IP-CAN session to the address of the allocated PCRF if the IP-CAN session does not exist in the association relation table; and at the meantime, forwards the message received from the PCEF entity or the GWCF entity to the PCRF.

Herein, the DRA allocates the PCRF according to a packet data network identification (PDN ID) carried in the message or the local configuration condition (e.g., the local load balancing rule).

(c) After the PCRF receives the message from the PCEF entity or the GWCF entity, it makes the PCC policy for the IP-CAN session, and forwards the PCC policy as a response to the corresponding P-GW or S-GW through the DRA.

(d) When the AF needs to send an IP-CAN session service message to the PCRF, it sends the message first to the DRA; the DRA searches for the locally stored PCRF address information associated with the IP-CAN session, and forwards the message to the PCRF; and then the DRA forwards a response message received from the PCRF to the corresponding AF.

The association relation of the IP-CAN session stored in the DRA includes the identification of the IP-CAN session (IP-CAN ID), PCEF address/GWCF address/AF address, UE ID, UE IP address, PDN ID and PCRF address.

The above technical scheme of the present invention will be described in detail below in conjunction with embodiments and accompanying drawings. The 3GPP core networks in the listed embodiments all apply the EPC architecture.

Embodiment 1

Figure 1:
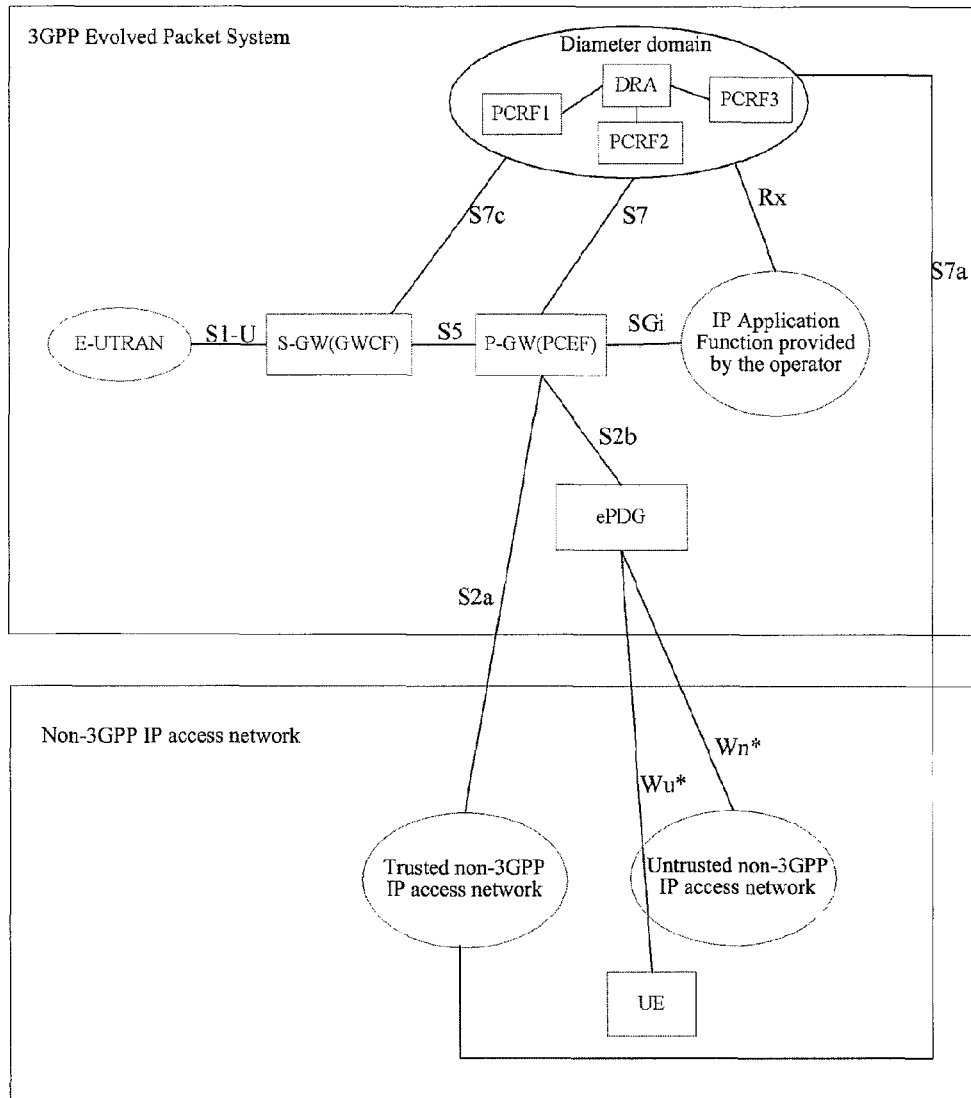
FIG. 1 is a block diagram of the architecture of the EPS of 3GPP.
Figure 2:
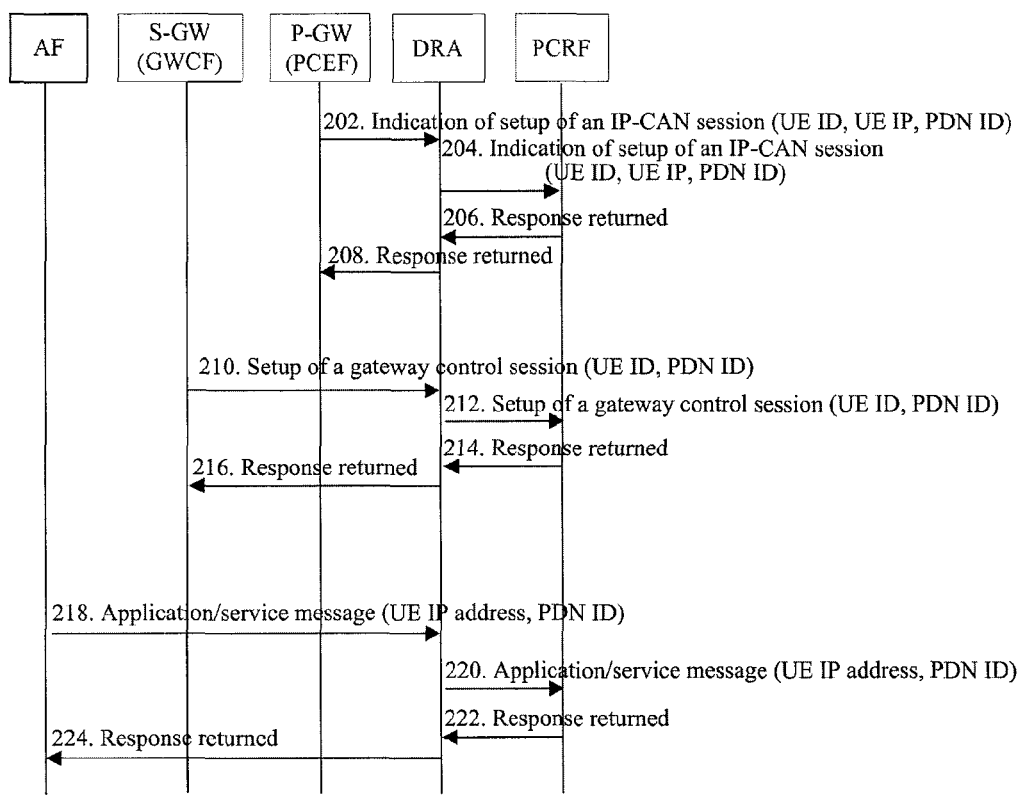
FIG. 2 is a flow chart of a method in accordance with the first embodiment of the present invention.

A process, in which the protocol of an interface between an S-GW and a P-GW in the EPC is based on the PMIP, and a UE within the coverage of 3GPP initiates an IP-CAN session, is described in this embodiment. Firstly, the UE initiates an IP-CAN session setup request to the P-GW, which forwards a message to a PCRF through a DRA; after the DRA selects the PCRF and stores locally an association relation between the IP-CAN session and the PCRF, the S-GW and an AF forwards a network control session setup message and an application/service message respectively to the same PCRF through the DRA. A flow chart of this process is illustrated in FIG. 2, and each step of it is described as follows.

202: The P-GW sends a message indicating an IP-CAN session is set up to the DRA to notify the PCRF that the IP-CAN session is set up. The message contains information of UE ID, UE IP address, PDN ID and IP-CAN session ID.

Herein, the P-GW selects the DRA according to local configuration or the PDN ID.

204: After the DRA receives the indication message, it searches for the PCRF information associated with the IP-CAN session by using the UE ID, UE IP address, PDN ID and IP-CAN session ID carried in the message as a search condition of the IP-CAN session. Since the session setup request is presented for the first time, at this point, there is no PCRF information associated with the IP-CAN session on the DRA. The DRA selects a PCRF for the IP-CAN session according to the PDN ID or local configuration, stores the association relation between the IP-CAN session and the PCRF, and at the meantime, forwards the message indicating the IP-CAN session is set up from the P-GW to the PCRF.

206: After the PCRF receives the message indicating the IP-CAN session is set up, it makes a corresponding PCC policy for the session, and returns a response message containing the PCC policy to the DRA.

208: The DRA forwards the response message received from the PCRF to the P-GW.

210: The S-GW sends a gateway control session setup message, which contains information of the UE ID and PDN ID, to the DRA to notify the PCRF that a gateway control session is set up.

212: After the DRA receives the message, it searches for the PCRF information associated with the IP-CAN session by using the information of the UE ID and PDN ID carried in the message as the search condition of the IP-CAN session. Since the DRA has stored previously the association relation between the IP-CAN session and the PCRF, the DRA uses the PCRF address acquired by the searching as a destination address to forward the gateway control session setup message from the S-GW.

214: After the PCRF receives the gateway control session setup message, it makes a corresponding PCC policy for the session, and returns a response message containing the PCC policy to the DRA.

216: The DRA receives the response message from the PCRF and forwards the response message to the S-GW.

218: The AF sends an application/service message of the IP-CAN session, which contains the UE IP address and PDN ID, to the DRA to transmit the application/service to the PCRF.

220: After the DRA receives the message, it searches for the PCRF information associated with the IP-CAN session by using the UE IP address and PDN ID carried in the message as the search condition of the IP-CAN session. Since the DRA has stored the association relation between the IP-CAN session and the PCRF, the DRA uses the PCRF address acquired by the searching as a destination address to forward the application/service message from the AF.

222: After the PCRF receives the application/service message, the PCRF makes a corresponding PCC policy for it and returns a response message containing the PCC policy to the DRA.

224: The DRA forwards the response message received from the PCRF to the AF.

Wherein, the association relation of the IP-CAN session stored in the DRA includes the identification of the IP-CAN session (IP-CAN ID), P-GW address/S-GW address/AF address, UE ID, UE IP address, PDN ID and PCRF address.

Embodiment 2

Figure 3:
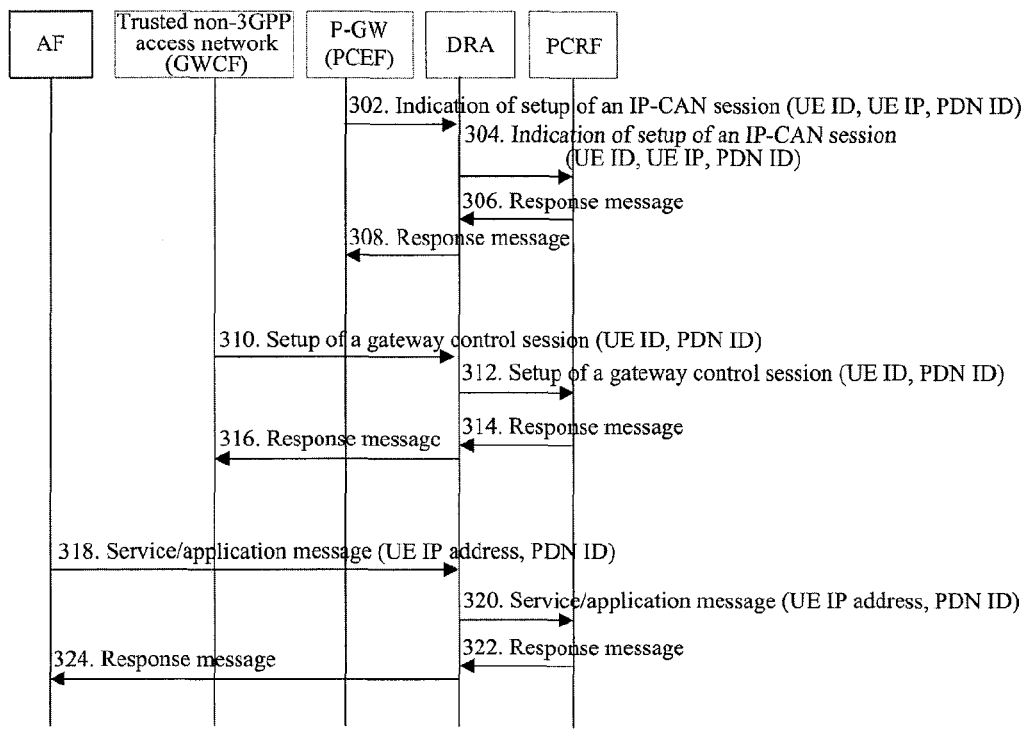
FIG. 3 is a flow chart of a method in accordance with the second embodiment of the present invention.

A process, in which a trusted non-3GPP access gateway and a P-GW use the Mobile Internet Protocol (MIP) and set up a MIP tunnel between them, and a UE within the coverage of a trusted non-3GPP access network initiates an IP-CAN session, is described in this embodiment. Firstly, the UE initiates an IP-CAN session setup request, and the P-GW forwards a message to a PCRF through a DRA; the DRA selects the PCRF after receiving the message from the P-GW, and stores locally an association relation between the IP-CAN session and the PCRF; then the trusted non-3GPP access gateway and an AF forwards a network control session setup message and an application/service message respectively to the same PCRF through the DRA. The flow chart of this process is illustrated in FIG. 3, and each step of it is described as follows.

302: The P-GW sends a message indicating an IP-CAN session is set up to the DRA to notify the PCRF that the IP-CAN session is set up. The message contains information of UE ID, UE IP address, and PDN ID.

304: After the DRA receives the message, it searches for the PCRF information associated with the IP-CAN session by using the information of the UE ID, UE IP address and PDN ID carried in the message as a search condition of the IP-CAN session. Since the session setup request is presented for the first time, at this point, there is no PCRF information associated with the IP-CAN session on the DRA. The DRA selects a PCRF for the IP-CAN session according to the PDN ID or local configuration, stores the association relation between the IP-CAN session and the PCRF, and at the meantime, forwards the message indicating the IP-CAN session is set up from the P-GW to the PCRF.

306: After the PCRF receives the message indicating the IP-CAN session is set up, it makes a corresponding PCC policy for the session, and returns a response message containing the PCC policy to the DRA.

308: The DRA forwards the response message received from the PCRF to the P-GW.

310: The trusted non-3GPP access gateway sends a gateway control session setup message, which contains information of the UE ID and PDN ID, to the DRA to notify the PCRF that a gateway control session is set up.

312: After the DRA receives the message, it searches for the PCRF information associated with the IP-CAN session by using the information of the UE ID and PDN ID carried in the message as the search condition of the IP-CAN session. Since the DRA has stored previously the association relation between the IP-CAN session and the PCRF, the DRA uses the PCRF address acquired by the searching as a destination address to forward the gateway control session setup message from the trusted non-3GPP access gateway.

314: After the PCRF receives the gateway control session setup message, the PCRF makes a corresponding PCC policy for it and returns a response message to the DRA.

316: The DRA forwards the response message received from the PCRF to the trusted non-3GPP access gateway.

318: The AF sends an application/service message of the IP-CAN session, which contains information of the UE IP address and PDN ID, to the DRA to transmit the application/service to the PCRF.

320: After the DRA receives the message, it searches for the PCRF information associated with the IP-CAN session by using the information of the UE IP address and PDN ID carried in the message as the search condition of the IP-CAN session. Since the DRA has stored the association relation between the IP-CAN session and the PCRF, the DRA uses the PCRF address acquired by the searching as a destination address to forward the application/service message from the AF.

322: After the PCRF receives the application/service message, the PCRF makes a corresponding PCC policy for it and returns a response message containing the PCC policy to the DRA.

324: The DRA forwards the response message received from the PCRF to the AF.

Wherein, the association relation of the IP-CAN session stored in the DRA includes the identification of the IP-CAN session (IP-CAN ID), P-GW address/S-GW address/AF address, UE ID, UE IP address, PDN ID and PCRF address.

Embodiment 3

Figure 4:
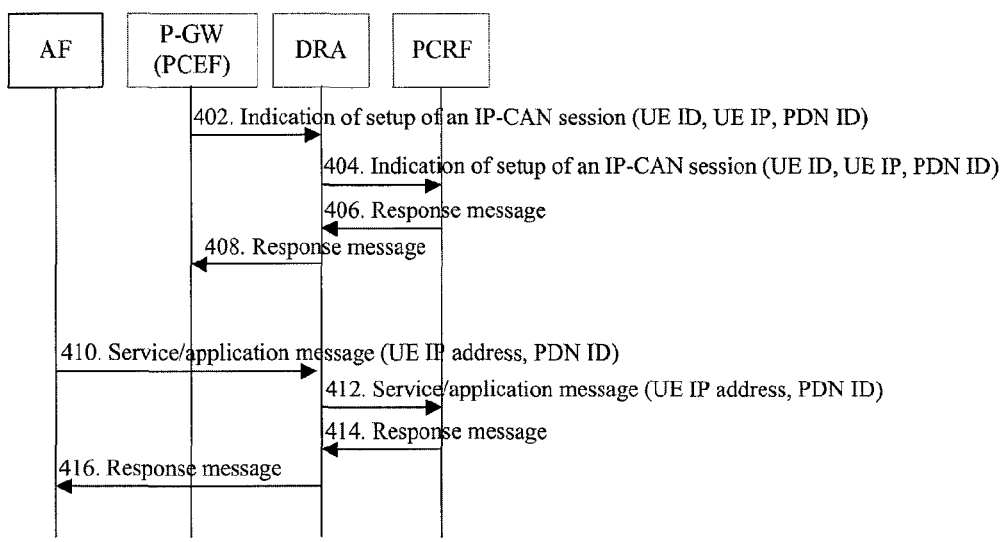
FIG. 4 is a flow chart of a method in accordance with the third embodiment of the present invention.

A process, in which a UE within the coverage of untrusted non-3GPP initiates an IP-CAN session, is described in this embodiment. Firstly, the UE initiates an IP-CAN session setup request, and a P-GW forwards a message to a PCRF through a DRA; the DRA selects the PCRF after receiving the message from the P-GW, and stores locally an association relation between the IP-CAN session and the PCRF; then an AF forwards an application/service message of the IP-CAN session to the same PCRF through the DRA. The flow chart of this process is illustrated in FIG. 4, and each step of it is described as follows.

402: The P-GW sends a message indicating an IP-CAN session is set up to the DRA to notify the PCRF that the IP-CAN session is set up. The message contains information of UE ID, UE IP address and PDN ID.

404: After the DRA receives the message, it searches for the PCRF information associated with the IP-CAN session by using the information of the UE ID, UE IP address and PDN ID carried in the message as a search condition of the IP-CAN session. Since the session setup request is presented for the first time, at this point, there is no PCRF information associated with the IP-CAN session on the DRA. The DRA selects a PCRF for the IP-CAN session according to the PDN ID or local configuration, stores the association relation between the IP-CAN session and the PCRF, and at the meantime, forwards the message indicating the IP-CAN session is set up from the P-GW to the PCRF.

406: After the PCRF receives the message indicating the IP-CAN session is set up, it makes a corresponding PCC policy for the session, and returns a response message to the DRA.

408: The DRA forwards the response message received from the PCRF to the P-GW.

410: The AF sends an application/service message of the IP-CAN session, which contains information of the UE IP address and PDN ID, to the DRA to transmit the application/service to the PCRF.

412: After the DRA receives the message, it searches for the PCRF information associated with the IP-CAN session by using the information of the UE IP address and PDN ID carried in the message as the search condition of the IP-CAN session. Since the DRA has stored the association relation between the IP-CAN session and the PCRF, the DRA uses the PCRF address acquired by the searching as a destination address to forward the application/service message from the AF.

414: After the PCRF receives the application/service message, the PCRF makes a corresponding PCC policy for it and returns a response message to the DRA.

416: The DRA forwards the response message received from the PCRF to the AF.

Wherein, the association relation of the IP-CAN session stored in the DRA includes the identification of the IP-CAN session (IP-CAN ID), P-GW address/AF address, UE ID, UE IP address, PDN ID and PCRF address.

It can be seen from the above three embodiments that the method of the present invention enables the EPS of the 3GPP to associate all of the PCEF, GWCF and AF related to an IP-CAN session of a UE in a non-roaming scenario with the same PCRF, so as to ensure that the PCC policy of one IP-CAN session is determined by only one PCRF.

Of course, many other embodiments in accordance with the present invention may be used. Various corresponding modifications and variations may be made by those skilled in the art according to the present invention, without departing from the spirit and essence of the present invention. However, all of these corresponding modifications and variations shall fall within the protection scope defined by the appended claims of the present invention.

INDUSTRIAL APPLICABILITY

The present invention is able to associate all of the PCEF, GWCF and AF related to an IP-CAN session of a UE in a non-roaming scenario with the same PCRF, in order to facilitate the development of the 3GPP network.

What is claimed is:

1. A method for selecting a Policy and Charging Rules Function (PCRF) entity in a non-roaming scenario, comprising:

when a Diameter Routing Agent (DRA) receives an IP Connectivity Access Network (IP-CAN) session setup indication message, the DRA forwarding the session setup indication message to a PCRF according to an association relation established and stored for allocating the PCRF entity to the IPCAN session, wherein the DRA allocates the PCRF entity according to a Packet Data Network Identification (PDN ID) carried in the indication message or according to local configuration condition; and forwarding a corresponding Policy and Charging Control (PCC) policy, which is made by the PCRF for the IPCAN session, to a network element having a policy and charging enforcement function and an IP Application Function (AF) of an operator corresponding to the IPCAN session;

(a) when a user equipment (UE) initiates an IPCAN session setup request, the network element having the policy and charging enforcement function sending the indication message to the DRA;

(b) after the DRA receives the indication message, the DRA searching the association relation stored locally, and if the IPCAN session does not exist in the association relation, binding and storing an address of the PCRF allocated to the IPCAN session, an identification of the IPCAN (IPCAN ID) and the PDN ID in the local association relation; if the IPCAN session exists in the association relation, acquiring a stored address of the PCRF associated with the IPCAN session; and the DRA forwarding the indication message according to the address of the PCRF associated with the IPCAN session;

(c) after the PCRF receives the indication message, the PCRF making the PCC policy for the IPCAN session, and forwarding, through the DRA, a response message containing the PCC policy to the entity network element having the policy and charging enforcement function;

(d) the AF sending a message of the IPCAN session service to the PCRF through the DRA; the DRA searching the association relation stored locally, and forwarding the message of the session service to the PCRF according to the address of the PCRF associated with the IPCAN session; and (e) after the PCRF receives the message of the session service, the PCRF making a corresponding PCC policy for the session service, and forwarding a response message containing the PCC policy to the AF through the DRA.

2. The method according to claim 1, wherein the entity having the policy and charging enforcement function is a Policy and Charging Enforcement Function (PCEF) entity or a Gateway Control Function (GWCF) entity.

3. The method according to claim 2, wherein the IPCAN session setup indication message is sent by the PCEF entity or the GWCF entity, and afterwards, when the DRA further receives a different session setup indication message related to the IPCAN session, the method further comprises steps of:

the DRA forwarding the session setup indication message to the PCRF according to an address of the PCRF acquired by searching; and after the PCRF receives the session setup indication message, the PCRF making a corresponding PCC policy for the session, and forwarding, through the DRA, a response message containing the PCC policy to an entity which sent the different session setup indication message.

4. The method according to claim 1, wherein information carried in the indication message further includes the IPCAN ID, an identification of the UE (UE ID), and an IP address of the UE (UE IP address); and the association relation of the IPCAN session stored in the DRA further includes an address of the PCEF entity or an address of the GWCF entity, an address of the AF, the UE ID, IP address and an address of the PCRF.

5. The method according to claim 1, wherein the PCEF entity resides in a packet data network gateway or a trusted non3GPP access gateway; the GWCF entity resides in a service gateway.

6. The method according to claim 1, wherein the entity having the policy and charging enforcement function is a Policy and Charging Enforcement Function (PCEF) entity or a Gateway Control Function (GWCF) entity.

7. The method according to claim 1, wherein information carried in the indication message further includes the IPCAN ID, an identification of the UE (UE ID), and an IP address of the UE (UE IP address); and the association relation of the IPCAN session stored in the DRA further includes an address of the PCEF entity or an address of the GWCF entity, an address of the AF, the UE ID, the UE IP address and an address of the PCRF.

8. The method according to claim 1, wherein the PCEF entity resides in a packet data network gateway or a trusted non3GPP access gateway; the GWCF entity resides in a service gateway.

* * * * *